United States Patent
Hwang et al.

(10) Patent No.: US 11,417,436 B2
(45) Date of Patent: Aug. 16, 2022

(54) APPARATUS FOR DECOMMISSIONING HEAVY-WATER REACTOR FACILITIES AND METHOD FOR DECOMMISSIONING HEAVY-WATER REACTOR FACILITIES

(71) Applicant: KOREA HYDRO & NUCLEAR POWER CO., LTD., Gyeongju-si (KR)

(72) Inventors: Seok-Ju Hwang, Daejeon (KR); Young Hwan Hwang, Daejeon (KR); Sung-Hoon Hong, Daegu (KR); Cheon-Woo Kim, Daejeon (KR)

(73) Assignee: KOREA HYDRO & NUCLEAR POWER CO., LTD., Gyeongju-si (KR)

( * ) Notice: Subject to any disclaimer, the term of this patent is extended or adjusted under 35 U.S.C. 154(b) by 0 days.

(21) Appl. No.: 17/259,655

(22) PCT Filed: Jul. 3, 2019

(86) PCT No.: PCT/KR2019/008146
§ 371 (c)(1),
(2) Date: Jan. 12, 2021

(87) PCT Pub. No.: WO2020/013516
PCT Pub. Date: Jan. 16, 2020

(65) Prior Publication Data
US 2021/0287817 A1     Sep. 16, 2021

(30) Foreign Application Priority Data

Jul. 13, 2018 (KR) .......................... 10-2018-0081783

(51) Int. Cl.
*G21D 1/00*     (2006.01)
*G21D 1/02*     (2006.01)
*G21C 19/20*    (2006.01)

(52) U.S. Cl.
CPC ........... *G21D 1/003* (2013.01); *G21C 19/207* (2013.01); *G21D 1/02* (2013.01)

(58) Field of Classification Search
CPC . G21D 1/003; G21D 1/02; G21C 1/20; G21C 19/207; Y02E 30/30; Y02E 30/00; G21F 9/28
(Continued)

(56) References Cited

U.S. PATENT DOCUMENTS 2,863,815 A * 12/1958 Moore ...................... G21C 1/12
376/262
3,158,544 A * 11/1964 Jerkins ................... G21C 19/08
376/269

(Continued)

FOREIGN PATENT DOCUMENTS

CA      2727492 C  *  9/2014  ............. G21C 19/14
JP      2005-291710     10/2005
(Continued)

*Primary Examiner* — Darlene M Ritchie
(74) *Attorney, Agent, or Firm* — Lex IP Meister, PLLC

(57) ABSTRACT

An apparatus for decommissioning heavy-water reactor facilities includes a shielding device including a drawing-out space that is mounted on the reactivity mechanism deck and communicates with one through-hole among the plurality of through-holes, a separating device that is inserted into the inside of one of the plurality of guide tubes through the drawing-out space and the one through-hole and cuts an end portion of the one guide tube connected to the calandria, and a drawing-out device that is inserted into the inside of the one guide tube through the drawing-out space and the one through-hole and supports the end portion of the one guide tube to draw out the one guide tube into the inside of the drawing-out space through the one through-hole.

8 Claims, 10 Drawing Sheets

(58) Field of Classification Search
USPC .................. 376/264, 262, 340, 341; 414/146
See application file for complete search history.

(56) References Cited

U.S. PATENT DOCUMENTS

| | | | | |
|---|---|---|---|---|
| 4,070,239 | A * | 1/1978 | Bevilacqua | G21C 17/116 |
| | | | | 976/DIG. 240 |
| 4,756,656 | A * | 7/1988 | Candee | G21C 19/26 |
| | | | | 414/146 |
| 5,404,382 | A * | 4/1995 | Russ | G21C 13/036 |
| | | | | 376/260 |
| 6,000,311 | A * | 12/1999 | Katoh | G21C 9/00 |
| | | | | 83/639.4 |
| 2018/0151263 | A1* | 5/2018 | Good | G21C 13/036 |

FOREIGN PATENT DOCUMENTS

| | | |
|---|---|---|
| JP | 4256349 | 4/2009 |
| KR | 10-0712702 | 5/2007 |
| KR | 10-2013-0120322 | 11/2013 |
| KR | 10-1390889 | 5/2014 |
| KR | 10-1776102 | 9/2017 |

* cited by examiner

APPARATUS FOR DECOMMISSIONING HEAVY-WATER REACTOR FACILITIES AND METHOD FOR DECOMMISSIONING HEAVY-WATER REACTOR FACILITIES

TECHNICAL FIELD

The present disclosure relates to an apparatus for decommissioning heavy-water reactor facilities and a method for decommissioning heavy-water reactor facilities.

BACKGROUND ART

Generally, heavy-water reactor facilities including a calandria among nuclear facilities used for nuclear power generation further include a calandria vault for accommodating the calandria, a reactivity mechanism deck supported by the calandria vault and located at an upper portion of the calandria, and guide tubes connected to the calandria through through-holes included in the reactivity mechanism deck.

When decommissioning the heavy-water reactor facility, in order to easily separate the calandria from the calandria vault, it is necessary to separate the guide tubes connected to the calandria from the calandria.

DISCLOSURE

Technical Problem

An embodiment provides an apparatus for decommissioning heavy-water reactor facilities and a method for decommissioning heavy-water reactor facilities that easily separates guide tubes connected to a calandria from the calandria through through-holes of a reactivity mechanism deck.

Technical Solution

An embodiment provides an apparatus for decommissioning heavy-water reactor facilities that includes a calandria, a calandria vault accommodating the calandria, a reactivity mechanism deck supported by the calandria vault to be located at an upper portion of the calandria and including a plurality of through-holes, and a plurality of guide tubes connected to the calandria through the plurality of through-holes, including: a shielding device including a drawing-out space that is mounted on the reactivity mechanism deck and communicates with one through-hole among the plurality of through-holes; a separating device that is inserted into the inside of one of the plurality of guide tubes through the drawing-out space and the one through-hole and cuts an end portion of the one guide tube connected to the calandria; and a drawing-out device that is inserted into the inside of the one guide tube through the drawing-out space and the one through-hole and supports the end portion of the one guide tube to draw out the one guide tube into the inside of the drawing-out space through the one through-hole.

The shielding device may further include a driver that vertically moves the separating device and the drawing-out device.

The shielding device may further include a cutting unit that cuts a portion of the one guide tube drawn out into the inside of the drawing-out space.

The cutting unit may include: a tube fixing part fixing the one guide tube; a moving tray positioned on the tube fixing part and sliding into the drawing-out space to contact the one guide tube; a cutting part positioned on the moving tray and cutting the portion of the one guide tube; and a magnetic gripper positioned on the cutting part and supporting the one guide tube.

The separating device may include: a first driving shaft that moves up and down into the inside of the one guide tube through the drawing-out space and the one through-hole to rotate; a cutting tip positioned at an end portion of the first driving shaft and sliding from the inside to the outside of the first driving shaft; and a first push rod inserted into the inside of the first driving shaft and sliding the cutting tip outward.

The drawing-out device may include: a second driving shaft that moves up and down into the inside of the one guide tube through the drawing-out space and the one through-hole to rotate; a rigging tip positioned at an end portion of the second driving shaft and sliding from the inside to the outside of the second driving shaft; and a second push rod inserted into the inside of the second driving shaft and sliding the rigging tip outward.

Another embodiment provides a method for decommissioning heavy-water reactor facilities that includes a calandria, a calandria vault accommodating the calandria, a reactivity mechanism deck supported by the calandria vault to be located at an upper portion of the calandria and including a plurality of through-holes, and a plurality of guide tubes connected to the calandria through the plurality of through-holes, including: mounting a shielding device including a drawing-out space communicating with one through-hole among the plurality of through-holes on the reactivity mechanism deck; inserting a separating device into the inside of one of the plurality of guide tubes through the drawing-out space and the one through-hole to cut an end portion of the one guide tube connected to the calandria; and inserting a drawing-out device into the inside of the one guide tube through the drawing-out space and the one through-hole to support the end portion of the one guide tube to draw out the one guide tube into the inside of the drawing-out space through the one through-hole.

The method for decommissioning the heavy-water reactor facilities may further include cutting a portion of the one guide tube drawn out into the inside of the drawing-out space by using a cutting unit.

The method for decommissioning the heavy-water reactor facilities may further include separating, by the one guide tube, the shielding device drawn out into the inside of the drawing-out space from the reactivity mechanism deck and closing and sealing the shielding device.

Advantageous Effects

According to the embodiment, it is possible to provide an apparatus for decommissioning heavy-water reactor facilities and a method for decommissioning heavy-water reactor facilities that easily separates guide tubes connected to a calandria from the calandria through through-holes included of a reactivity mechanism deck.

MODE FOR INVENTION

The present invention will be described more fully hereinafter with reference to the accompanying drawings, in which embodiments of the invention are shown. As those skilled in the art would realize, the described embodiment may be modified in various different ways, all without departing from the spirit or scope of the present embodiment.

In addition, unless explicitly described to the contrary, the word "comprise" and variations such as "comprises" or "comprising" will be understood to imply the inclusion of stated elements but not the exclusion of any other elements.

Hereinafter, an apparatus for decommissioning heavy-water reactor facilities according to an embodiment will be described with reference to FIG. 1 to FIG. 6.

Hereinafter, an apparatus for decommissioning heavy-water reactor facilities that separates guide tubes included in CANDU-type heavy-water reactor facilities including calandria as heavy-water reactor facilities is exemplarily described, but is not limited thereto.

Figure 1:
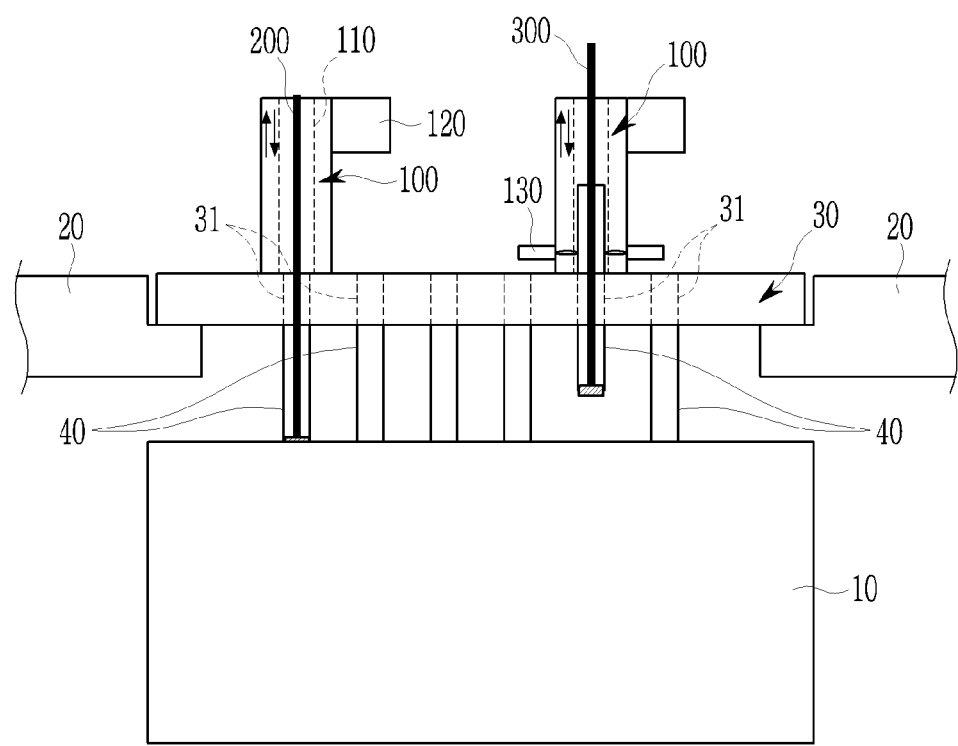
FIG. 1 illustrates an apparatus for decommissioning heavy-water reactor facilities according to an embodiment.

FIG. 1 illustrates a schematic view of an apparatus for decommissioning heavy-water reactor facilities according to an embodiment.

Referring to FIG. 1, a heavy-water reactor facility includes a calandria 10, a calandria vault 20 for accommodating the calandria 10, a reactivity mechanism deck 30 supported by the calandria vault 20 to be located at an upper portion of the calandria 10 and including a plurality of through-holes 31, and a plurality of guide tubes 40 connected to the calandria 10 through the plurality of through-holes 31. The heavy-water reactor facility may be in a state in which a control device and a monitoring device of a control rod and an absorbent rod that are supported by the reactivity mechanism deck 30 to be inserted into the inside of the calandria 10 through the guide tubes 40 passing through the through-hole 31, and a tread plate covering the reactivity mechanism deck 30, are decommissioned, but is not limited thereto.

The apparatus for decommissioning heavy-water reactor facilities according to the embodiment separates the guide tubes 40 connected to the calandria 10 from the calandria 10 through the through-holes 31 of the reactivity mechanism deck 30.

The apparatus for decommissioning heavy-water reactor facilities includes a shielding device 100, a separating device 200, and a drawing-out device 300.

The shielding device 100 is mounted on the reactivity mechanism deck 30 to shield the one through-hole 31 so as to correspond to one through-hole 31 in which a shielding plug for shielding one through-hole 31 among the plurality of through-holes 31 of the reactivity mechanism deck 30 is removed.

The shielding device 100 may be mounted on the reactivity mechanism deck 30 so as to pass through the plurality of through-holes 31 to correspond to one through-hole 31 through which the one guide tube 40 to be separated among the plurality of guide tubes 40 connected to the calandria 10 passes.

The shielding device 100 includes a drawing-out space 110 that communicates with one through-hole 31, a driver 120 for vertically moving the separating device 200 and the drawing-out device 300, and a cutting unit 130.

The drawing-out space 110 communicates with one through-hole 31, and may have a larger diameter than that of the one through-hole 31. The separating device 200 and the drawing-out device 300 move up and down through the drawing-out space 110, so that one guide tube 40 through one through-hole 31 may be separated and drawn out from the calandria 10.

The separating device 200 or the drawing-out device 300 may be inserted into the drawing-out space 110. The separating device 200 through the drawing-out space 110 and the one through-hole 31 moves up and down to cut an end portion of the guide tube 40 connected to the calandria 10, and the drawing-out device 300 through the drawing-out space 110 and one through-hole 31 moves up and down to draw out the one guide tube 40 cut from the calandria 10 into the take-out space 110.

The driver 120 moves the separating device 200 and the drawing-out device 300 up and down. The driver 120 may include gears, shafts, motors, etc. connected to each other, and may include various known driving means as long as the separating device 200 and the drawing-out device 300 may be moved up and down through the drawing-out space 110 and one through-hole 31.

The cutting unit 130 cuts a portion of the guide tube 40 drawn out into the drawing-out space 110 through the through-hole 31 by the drawing-out device 300. The portion of the guide tube 40 cut by the cutting unit 130 may be drawn out to the outside of the shielding device 100 through the drawing-out space 110 to be closed and sealed in a waste container such as a drum.

Figure 2:
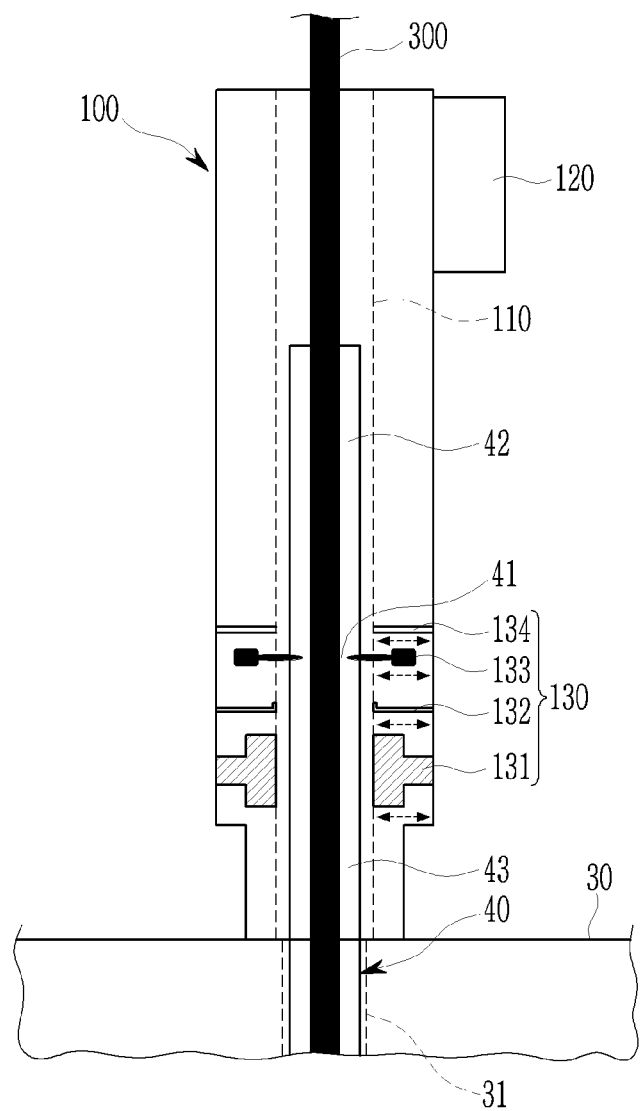
FIG. 2 illustrates a shielding device shown in FIG. 1.

FIG. 2 illustrates a schematic view of a shielding device shown in FIG. 1.

Referring to FIG. 2, the cutting unit 130 includes a tube fixing part 131, a moving tray 132, a cutting part 133, and a magnetic gripper 134.

The tube fixing part 131 is positioned on the reactivity mechanism deck 30, and fixes a lower portion 43 of one guide tube 40 that is drawn out into the drawing-out space 110 by the drawing-out device 300 through the drawing-out space 110. The tube fixing part 131 may slide into the drawing-out space 110, and may slide into the drawing-out space 110 to fix the lower part 43 of one guide tube 40.

The moving tray 132 is positioned on the tube fixing part 131, and slides into the drawing-out space 110 to contact one guide tube 40. The moving tray 132 may collect foreign materials generated when one guide tube 40 is cut by the cutting part 133. Accordingly, the moving tray 132 may prevent the foreign materials that may be generated by cutting of the guide tube 40 from falling down to a lower portion of the reactivity mechanism deck 30 through the drawing-out space 110 and the through-hole 31. The moving tray 132 is positioned between the tube fixing part 131 and the cutting part 133.

The cutting part 133 is positioned on the moving tray 132, and cuts a portion 41 of one guide tube 40. The one portion 41 of one guide tube 40 is positioned between the lower portion 43 of one guide tube 40 fixed by the tube fixing part 131 and an upper part 42 of one guide tube 40 supported by the magnetic gripper 134. The cutting part 133 slides into the drawing-out space 110 to cut the one portion 41 of one guide tube 40. The cutting part 133 may include various known cutting means as long as it may cut the one portion 41 of one guide tube 40. The cutting part 133 is positioned between the moving tray 132 and the magnetic gripper 134.

The magnetic gripper 134 is positioned on the cutting part 133, and supports the upper portion 42 of one guide tube 40. The magnetic gripper 134 may slide into the drawing-out space 110 or be fixed to an inner wall of the shielding device 100 forming the drawing-out space 110. The magnetic gripper 134 supports the upper portion 42 of one guide tube 40 by using magnetic force. When the portion 41 of one guide tube 40 is cut by the cutting part 133, the magnetic gripper 134 may support the upper portion 42 of one guide tube 40 to prevent the upper portion 42 from falling down to the reactivity mechanism deck 30 through the drawing-out space 110 and one through-hole 31.

Referring back to FIG. 1, the separating device 200 is inserted into one of the plurality of guide tubes 40 through the drawing-out space 110 and one through-hole 31. The separating device 200 cuts an end portion of one guide tube 40 connected to the calandria 10. Here, the end portion of one guide tube 40 may be a thimble, but is not limited thereto.

Figure 3:
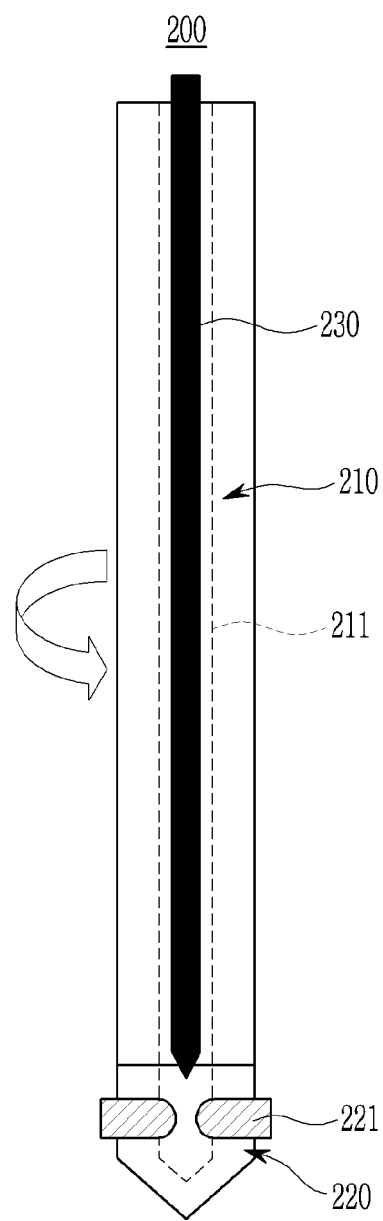
FIG. 3 illustrates a separating device shown in FIG. 1.
Figure 4:
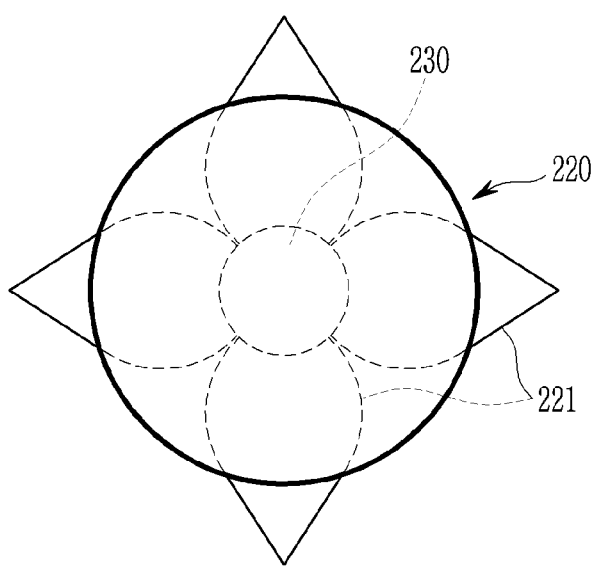
FIG. 4 illustrates an end portion of the separating device shown in FIG. 3.

FIG. 3 illustrates a schematic view of a separating device shown in FIG. 1. FIG. 4 illustrates an end portion of a separating device shown in FIG. 3.

Referring to FIG. 3 and FIG. 4, the separating device 200 includes a first driving shaft 210, a first end effector 220, and a first push rod 230.

The first driving shaft 210 moves up and down into the inside of one guide tube 40 through the drawing-out space 110 and one through-hole 31, and may rotate by itself. The first driving shaft 210 includes a first push space 211 formed therein. The first push rod 230 is inserted into the first push space 211 to allow a cutting tip 221 of the first end effector 220 to slide to the outside.

The first end effector 220 is positioned at an end portion of the first driving shaft 210, and includes the cutting tip 221 that slides from the inside to the outside of the first driving shaft 210. The cutting tip 221 includes four cutting blades, and the four cutting blades are rotated by rotation of the first driving shaft 210 to cut the end portion of one guide tube 40.

The first push rod 230 is inserted into the first driving shaft 210, and slides the cutting tip 221 outward. When the first end effector 220 is positioned at an inner end portion of one guide tube 40, the first push rod 230 is inserted into the first push space 211 of the first driving shaft 210 to allow the cutting tip 221 of the first end effector 220 to slide to the outside.

The first push rod 230 and the first driving shaft 210 may be driven by the driver 120.

Referring back to FIG. 1, the drawing-out device 300 is inserted into the inside of one guide tube 40 through the drawing-out space 110 and one through-hole 31. The drawing-out device 300 supports the end portion of one guide tube 40 separated from the calandria 10 by the separating device 200 to draw out one guide tube 40 into the drawing-out space 110 of the shield device 100 through one through-hole 31. In this case, a portion of one guide tube 40 may be cut by the cutting unit 130 of the shielding device 100.

Figure 5:
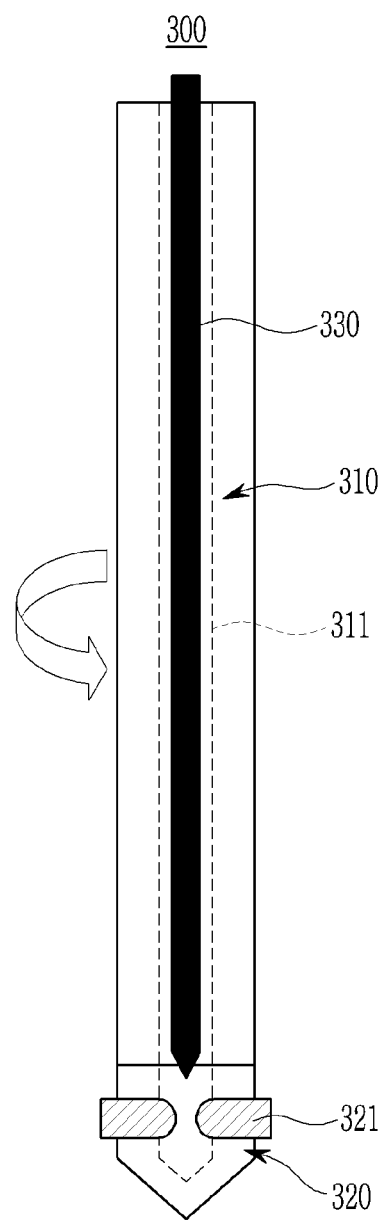
FIG. 5 illustrates a drawing-out device shown in FIG. 1.
Figure 6:
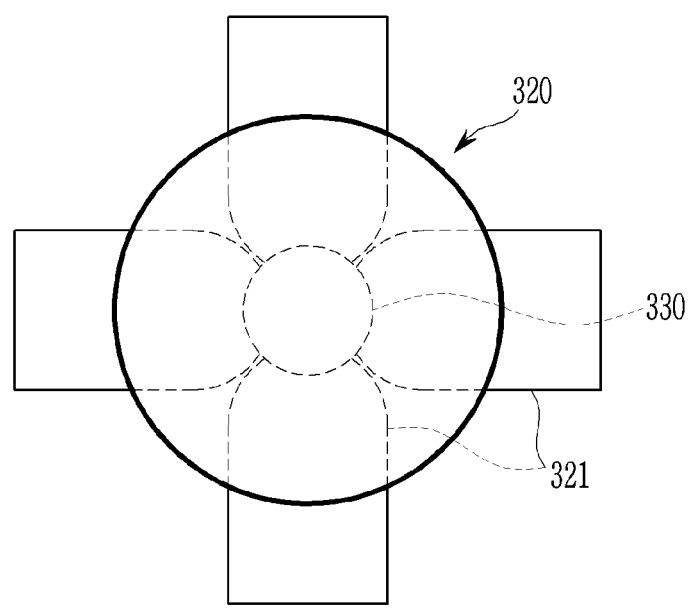
FIG. 6 illustrates an end portion of the drawing-out device shown in FIG. 5.

FIG. 5 illustrates a drawing-out device shown in FIG. 1. FIG. 6 illustrates an end portion of the drawing-out device shown in FIG. 5.

Referring to FIG. 5 and FIG. 6, the drawing-out device 300 includes a second driving shaft 310, a second end effector 320, and a second push rod 330.

The second driving shaft 310 moves up and down into the inside of one guide tube 40 through the drawing-out space 110 and one through-hole 31, and may rotate by itself. The second driving shaft 310 includes a second push space 311 formed therein. The second push rod 330 is inserted into the second push space 311 to allow a rigging tip 321 of the second end effector 320 to slide to the outside.

The second end effector 320 is positioned at an end portion of the second driving shaft 310, and includes the rigging tip 321 that slides from the inside to the outside of the second driving shaft 310. The rigging tip 321 includes four rigging portions, and the four rigging portions may support an end portion of one guide tube 40.

The second push rod 330 is inserted into the second driving shaft 310, and slides the rigging tip 321 outward. When the second end effector 320 is positioned at an inner end portion of one guide tube 40, the second push rod 330 is inserted into the second push space 311 of the second driving shaft 310 to allow the rigging tip 321 of the second end effector 320 to slide to the outside.

The second push rod 330 and the second driving shaft 310 may be driven by the driver 120.

The second driving shaft 310 and the second push rod 330 of the drawing-out device 300 may have the same configuration as the first driving shaft 210 and the first push rod 230 of the separating device 200.

For example, the separating device 200 may be used as a drawing-out device 300 by removing the first end effector 220 including the cutting tip 221 from the first driving shaft 210 and mounting the second end effector 320 including the rigging tip 321 on the first driving shaft 210.

As described above, according to the apparatus for decommissioning the heavy-water reactor facilities according to the embodiment, the shielding device 100 is mounted on the reactivity mechanism deck 30, the separating device 200 is inserted into the inside of one guide tube 40 through one through-hole 31 and the drawing-out space 110 to cut the end portion of one guide tube 40 connected to the calandria 10, and the drawing-out device 300 is inserted into the inside of one guide tube 40 through one through-hole 31 and the drawing-out space 110 to draw out one guide tube 40 into the drawing-out space 110, thereby easily separating the guide tubes 40 from the calandria 10.

That is, the apparatus for decommissioning the heavy-water reactor facilities that easily separates the guide tubes 40 connected to the calandria 10 from the calandria 10 through the through-holes 31 of the reactivity mechanism deck 30 is provided.

Hereinafter, a method for decommissioning heavy-water reactor facilities according to another embodiment will be described with reference to FIG. 7 and FIG. 8.

The method for decommissioning the heavy-water reactor facilities according to another embodiment may use the apparatus for decommissioning the heavy-water reactor facilities according to the embodiment described above, but is not limited thereto.

Figure 7:
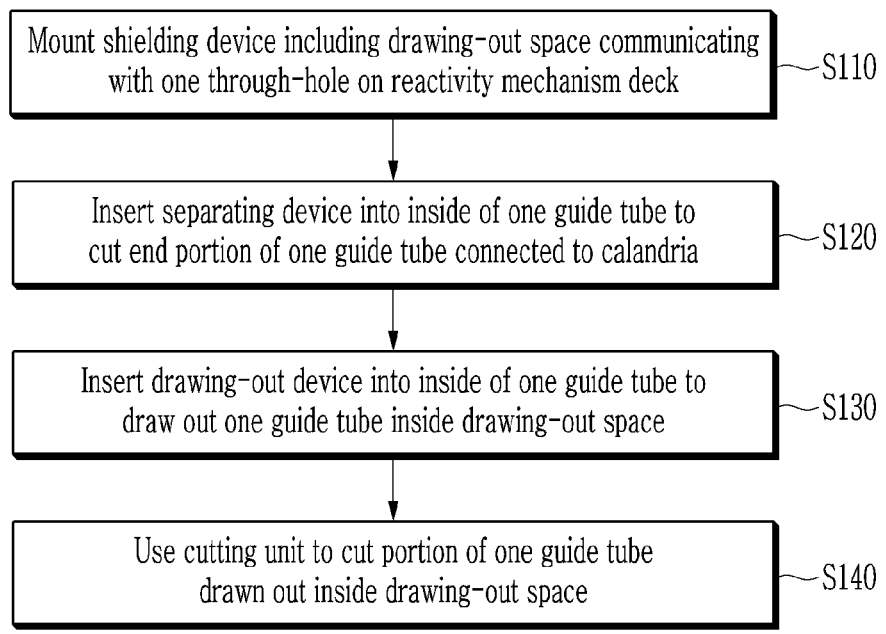
FIG. 7 illustrates a flowchart of a method for decommissioning heavy-water reactor facilities according to an embodiment.

FIG. 7 illustrates a flowchart of a method for decommissioning heavy-water reactor facilities according to an embodiment. FIG. 8 illustrates a schematic view for explaining a method for decommissioning heavy-water reactor facilities according to another embodiment.

Figure 8:
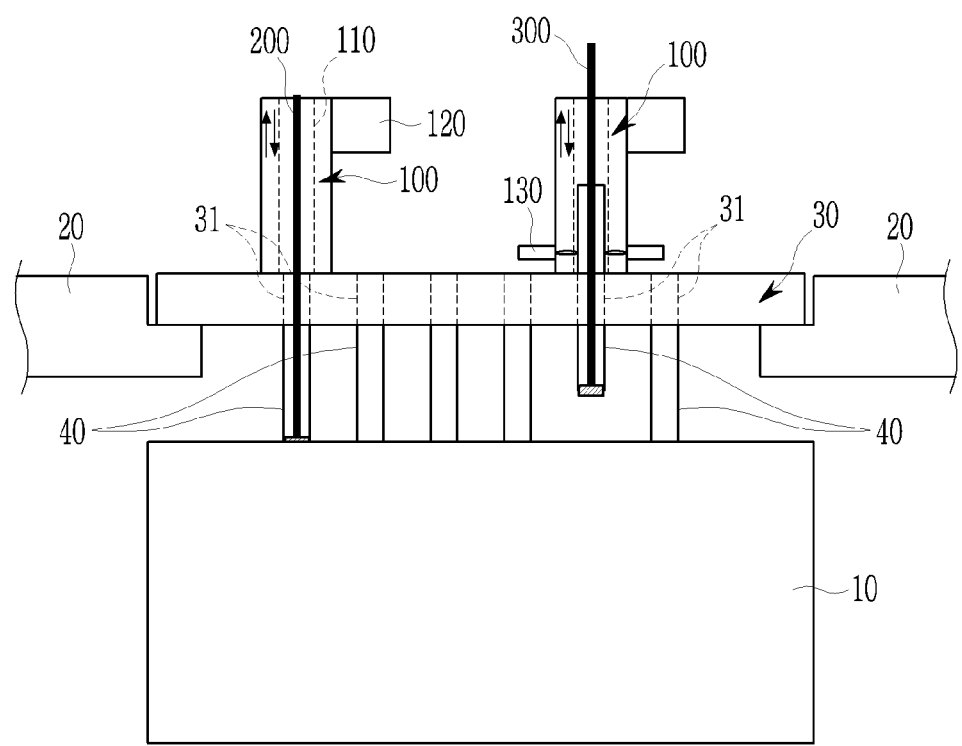
FIG. 8 illustrates a schematic view for explaining a method for decommissioning heavy-water reactor facilities according to another embodiment.

Referring to FIG. 7 and FIG. 8, first, the shielding device 100 including the drawing-out space 110 communicating with one through-hole 31 is mounted on the reactivity mechanism deck 30 (S110).

Specifically, the shielding device that includes the drawing-out space 100 communicating with one through-hole 31 among the plurality of through-holes 31 is mounted on the reactivity mechanism deck 30 of the heavy-water reactor facility including the calandria 10, the calandria vault 20, and the reactivity mechanism deck 30.

Next, the separating device 200 is inserted into the inside of one guide tube 40 to cut the end portion of one guide tube 40 connected to the calandria 10 (S120).

Specifically, the separating device 200 is inserted into the inside of one guide tube 40 among the plurality of guide tubes 40 through the drawing-out space 110 and one through-hole 31 by the driver 120 to cut the end portion of one guide tube 40 connected to the calandria 10.

Next, the drawing-out device 300 is inserted into the inside of one guide tube 40 to draw out one guide tube 40 into the inside of the drawing-out space 110 (S130).

Specifically, the drawing-out device 300 is inserted into the inside of one guide tube 40 through the drawing-out space 110 and one through-hole 31 to support the end portion of one guide tube 40 to draw out one guide tube 40 into the inside of the drawing-out space 110 through one through-hole 31.

Next, a portion of one guide tube 40 drawn out into the inside of the drawing-out space 110 is cut by using the cutting unit 130 (S140).

Specifically, a portion of one guide tube 40 drawn out into the inside of the drawing-out space 110 is cut by using the cutting unit 130. In this case, the guide tube 40 may be cut in a size corresponding to a size of a waste container such as a drum.

Next, the cut portions of one guide tube 40 may be received in a waste container to be transferred to another process.

As described above, according to the method for decommissioning the heavy-water reactor facilities according to the embodiment, the shielding device 100 is mounted on the reactivity mechanism deck 30, the separating device 200 is inserted into the inside of one guide tube 40 through one through-hole 31 and the drawing-out space 110 to cut the end portion of one guide tube 40 connected to the calandria 10, and one guide tube 40 is cut in a size corresponding to a size of a waste container while the drawing-out device 300 is inserted into the inside of one guide tube 40 through one through-hole 31 and the drawing-out space 110 to draw out one guide tube 40 into the drawing-out space 110.

That is, the method for decommissioning the heavy-water reactor facilities that easily separates the guide tubes 40 connected to the calandria 10 from the calandria 10 through the through-holes 31 of the reactivity mechanism deck 30 is provided.

Hereinafter, a method for decommissioning heavy-water reactor facilities according to another embodiment will be described with reference to FIG. 9 and FIG. 10.

The method for decommissioning the heavy-water reactor facilities according to another embodiment may use the apparatus for decommissioning the heavy-water reactor facilities according to the embodiment described above, but is not limited thereto.

For example, according to the method for decommissioning the heavy-water reactor facilities according to another embodiment, a cutting unit may be omitted in the apparatus for decommissioning the heavy-water reactor facilities according to the embodiment.

Hereinafter, different features from those of the above-described method for decommissioning the heavy-water reactor facilities according to another embodiment will be described.

Figure 9:
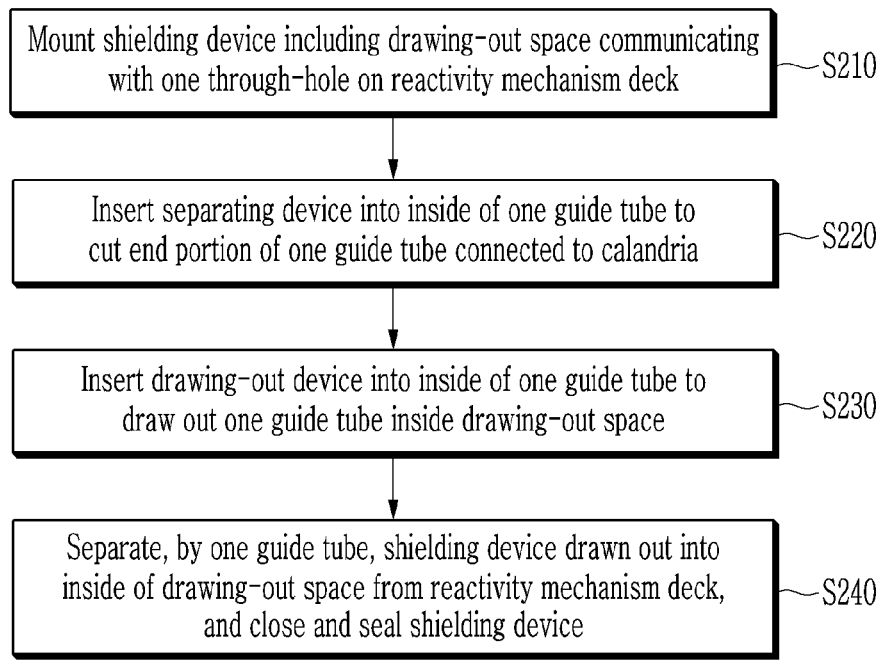
FIG. 9 illustrates a flowchart of a method for decommissioning heavy-water reactor facilities according to another embodiment.

FIG. 9 illustrates a flowchart of a method for decommissioning heavy-water reactor facilities according to another embodiment. FIG. 10 illustrates a schematic view for explaining a method for decommissioning heavy-water reactor facilities according to another embodiment.

Figure 10:
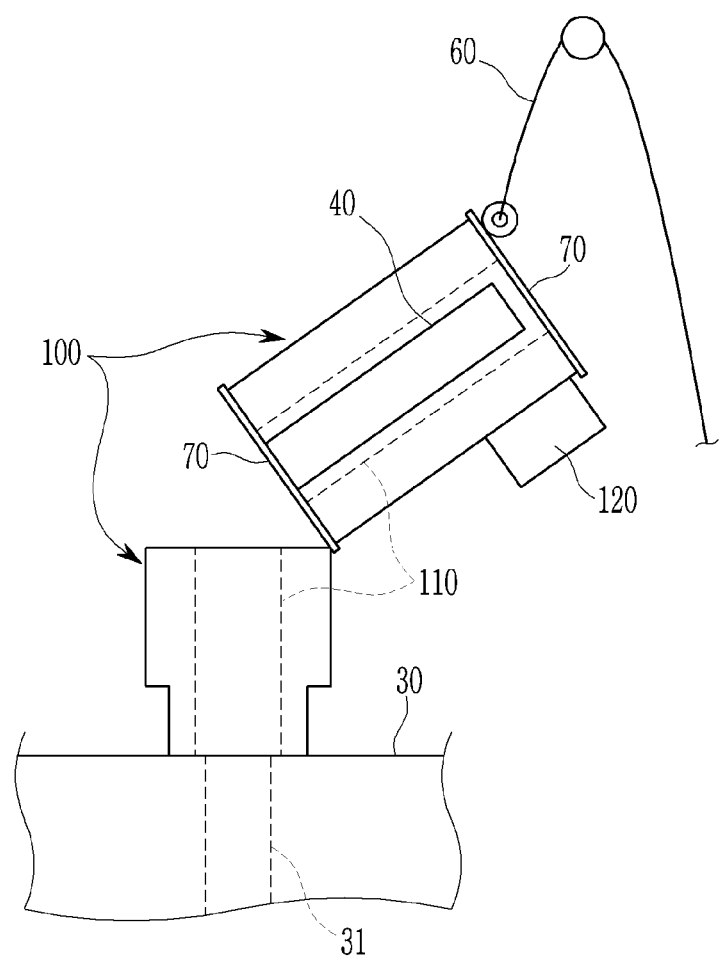
FIG. 10 illustrates a schematic view for explaining a method for decommissioning heavy-water reactor facilities according to another embodiment.

Referring to FIG. 9 and FIG. 10, first, the shielding device 100 including the drawing-out space 110 communicating with one through-hole 31 is mounted on the reactivity mechanism deck 30 (S210).

Next, the separating device is inserted into the inside of one guide tube 40 to cut the end portion of one guide tube 40 connected to the calandria (S220).

Then, the drawing-out device is inserted into the inside of one guide tube 40 to draw out one guide tube 40 into the inside of the drawing-out space 110 (S230).

Next, one guide tube 40 separates the shielding device 100 drawn out into the inside of the drawing-out space 110 from the reactivity mechanism deck 30, and closes and seals the shielding device 100 (S240).

Specifically, one guide tube 40 partially cuts the shielding device 100 drawn out into the inside of the drawing-out space 110 by using a cutting means to separate it from the reactivity mechanism deck 30. Then, it closes and seals the shielding device 100 in which one guide tube 40 is positioned inside the drawing-out space 110 by using a shielding stopper 70.

Next, one guide tube 40 may be transferred to another process by using the shielding device 100 that is closed and sealed as a waste container and by using a transfer means 60.

As described above, according to the method for decommissioning the heavy-water reactor facilities according to another embodiment, the shielding device 100 is mounted on the reactivity mechanism deck 30; the separating device 200 is inserted into the inside of one guide tube 40 through one through-hole 31 and the drawing-out space 110 to cut the end portion of one guide tube 40 connected to the calandria 10; the drawing-out device is inserted into the inside of one guide tube 40 through one through-hole 31 and the drawing-out space 110 to draw out one guide tube 40 into the drawing-out space 110; one guide tube 40 separates the shielding device 100 drawn into the drawing-out space 110 from the reactivity mechanism deck 30; and the shielding device 100 is sealed by using the shielding stopper 70 and used as a waste container, thus, the guide tubes 40 are easily separated from the calandria 10 without the need to use a separate waste container, and the guide tubes 40 are easily transferred to a next process.

That is, the method for decommissioning the heavy-water reactor facilities that easily separates the guide tubes 40 connected to the calandria 10 from the calandria 10 through the through-holes 31 of the reactivity mechanism deck 30 and easily transfers the guide tubes 40 to the next process is provided.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS calandria 10, calandria vault 20, reactivity mechanism deck 30, guide tube 40, shielding device 100, separating device 200, drawing-out device 300

The invention claimed is:

1. An apparatus for decommissioning heavy-water reactor facilities that includes a calandria, a calandria vault accommodating the calandria, a reactivity mechanism deck supported by the calandria vault to be located at an upper portion of the calandria and including a plurality of through-holes, and a plurality of guide tubes connected to the calandria through the plurality of through-holes, comprising:
   a shielding device including a drawing-out space that is mounted on the reactivity mechanism deck and communicates with one through-hole among the plurality of through-holes;
   a separating device that is inserted into the inside of one of the plurality of guide tubes through the drawing-out space and the one through-hole and cuts an end portion of the one guide tube connected to the calandria; and
   a drawing-out device that is inserted into the inside of the one guide tube through the drawing-out space and the one through-hole and supports the end portion of the one guide tube to draw out the one guide tube into the inside of the drawing-out space through the one through-hole,
   wherein
   the shielding device further includes a cutting unit that cuts a portion of the one guide tube drawn out into the inside of the drawing-out space and
   the cutting unit includes:
   a tube fixing part fixing the one guide tube;
   a moving tray positioned on the tube fixing part and sliding into the drawing-out space to contact the one guide tube;
   a cutting part positioned on the moving tray and cutting the portion of the one guide tube; and
   a magnetic gripper positioned on the cutting part and supporting the one guide tube.

2. The apparatus for decommissioning the heavy-water reactor facilities of claim 1, wherein
   the shielding device further includes a driver that vertically moves the separating device and the drawing-out device.

3. The apparatus for decommissioning the heavy-water reactor facilities of claim 1, wherein
   the drawing-out device includes:
   a second driving shaft that moves up and down into the inside of the one guide tube through the drawing-out space and the one through-hole to rotate;
   a rigging tip positioned at an end portion of the second driving shaft and sliding from the inside to the outside of the second driving shaft; and
   a second push rod inserted into the inside of the second driving shaft and sliding the rigging tip outward.

4. The apparatus for decommissioning the heavy-water reactor facilities of claim 1, wherein
   the separating device includes:
   a first driving shaft that moves up and down into the inside of the one guide tube through the drawing-out space and the one through-hole to rotate;
   a cutting tip positioned at an end portion of the first driving shaft and sliding from the inside to the outside of the first driving shaft; and
   a first push rod inserted into the inside of the first driving shaft and sliding the cutting tip outward.

5. An apparatus for decommissioning heavy-water reactor facilities that includes a calandria, a calandria vault accommodating the calandria, a reactivity mechanism deck supported by the calandria vault to be located at an upper portion of the calandria and including a plurality of through-holes, and a plurality of guide tubes connected to the calandria through the plurality of through-holes, comprising:
   a shielding device including a drawing-out space that is mounted on the reactivity mechanism deck and communicates with one through-hole among the plurality of through-holes;
   a separating device that is inserted into the inside of one of the plurality of guide tubes through the drawing-out space and the one through-hole and cuts an end portion of the one guide tube connected to the calandria; and
   a drawing-out device that is inserted into the inside of the one guide tube through the drawing-out space and the one through-hole and supports the end portion of the one guide tube to draw out the one guide tube into the inside of the drawing-out space through the one through-hole,
   wherein
   the separating device includes:
   a first driving shaft that moves up and down into the inside of the one guide tube through the drawing-out space and the one through-hole to rotate;
   a cutting tip positioned at an end portion of the first driving shaft and sliding from the inside to the outside of the first driving shaft; and
   a first push rod inserted into the inside of the first driving shaft and sliding the cutting tip outward.

6. A method for decommissioning heavy-water reactor facilities that includes a calandria, a calandria vault accommodating the calandria, a reactivity mechanism deck supported by the calandria vault to be located at an upper portion of the calandria and including a plurality of through-holes, and a plurality of guide tubes connected to the calandria through the plurality of through-holes, comprising:
   mounting a shielding device including a drawing-out space communicating with one through-hole among the plurality of through-holes on the reactivity mechanism deck;
   inserting a separating device into the inside of one of the plurality of guide tubes through the drawing-out space and the one through-hole to cut an end portion of the one guide tube connected to the calandria; and
   inserting a drawing-out device into the inside of the one guide tube through the drawing-out space and the one through-hole to support the end portion of the one guide tube to draw out the one guide tube into the inside of the drawing-out space through the one through-hole,
   wherein the drawing-out device includes:
   a second driving shaft that moves up and down into the inside of the one guide tube through the drawing-out space and the one through-hole to rotate;
   a rigging tip positioned at an end portion of the second driving shaft and sliding from the inside to the outside of the second driving shaft; and
   a second push rod inserted into the inside of the second driving shaft and sliding the rigging tip outward.

7. The method for decommissioning the heavy-water reactor facilities of claim 6, further including
   cutting a portion of the one guide tube drawn out into the inside of the drawing-out space by using a cutting unit.

8. The method for decommissioning the heavy-water reactor facilities of claim 6, further including separating, by the one guide tube, the shielding device drawn out into the inside of the drawing-out space from the reactivity mechanism deck and closing and sealing the shielding device.

* * * * *